(12) United States Patent
Chen et al.

(10) Patent No.: US 7,847,996 B2
(45) Date of Patent: Dec. 7, 2010

(54) ELECTRO-WETTING DISPLAY DEVICE

(75) Inventors: Sung-Yen Chen, Miao-Li (TW); Chien-Wen Wang, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 336 days.

(21) Appl. No.: 12/220,511

(22) Filed: Jul. 25, 2008

(65) Prior Publication Data
US 2009/0027751 A1 Jan. 29, 2009

(30) Foreign Application Priority Data
Jul. 25, 2007 (CN) .................. 2007 1 0075321

(51) Int. Cl.
*G02B 26/02* (2006.01)
(52) U.S. Cl. .................. 359/228; 359/296; 345/48; 345/49; 345/84; 345/105; 345/107
(58) Field of Classification Search ......... 359/227–228, 359/245, 253, 296, 665; 345/32, 41, 48–49, 345/60, 84, 102, 105, 107, 204
See application file for complete search history.

(56) References Cited

U.S. PATENT DOCUMENTS

| 6,924,792 | B1 * | 8/2005 | Jessop ................... 345/179 |
| 2006/0132404 | A1 * | 6/2006 | Hayes et al. ............ 345/84 |
| 2007/0075941 | A1 | 4/2007 | Zhou et al. |

\* cited by examiner

*Primary Examiner*—James Phan
(74) *Attorney, Agent, or Firm*—Wei Te Chung

(57) ABSTRACT

An exemplary electro-wetting display (EWD) device (30) includes a first substrate (31), a second substrate (39) facing the first substrate, a hydrophobic insulator (36) provided between the first and second substrates, a first fluid (33), a second fluid (32) and colored layers (38). The first fluid and the second fluid are immiscible and disposed between the hydrophobic insulator and the first substrate. The second fluid is electro-conductive or polar. The first fluid is located between the hydrophobic insulator and the second fluid. Colored layers may be located between the hydrophobic insulator and the second substrate.

19 Claims, 4 Drawing Sheets

ELECTRO-WETTING DISPLAY DEVICE

FIELD OF THE INVENTION

The present invention relates to an electro-wetting display (EWD) device including picture elements having first and second immiscible fluid within a space between a first substrate and a second substrate, the second fluid being electro-conductive or polar.

GENERAL BACKGROUND

EWD devices that adjust the amount of light to be transmitted by means of electrocapillarity (electro-wetting) are proposed. EWD devices display images with excellent brightness and contrast, and relatively low power consumption compared to many other display devices.

Referring to FIG. 6, this is a cross section view of part of a conventional EWD device before a voltage is applied thereto. The EWD device 10 includes a transparent substrate 11, a driving substrate 18 facing towards the transparent substrate 11, a first fluid 13, a second fluid 12, a plurality of side walls 16 and two support plates (not shown). The two support plates are provided between the two substrates 11, 18 for supporting the transparent substrate 11. Thereby, the two substrates 11, 18 and the two support plates define a sealed container (not labeled) for filling with the first fluid 13 and the second fluid 12. The side walls 16 are arranged in a lattice on an inner surface of the driving substrate 18 thereby defining a plurality of pixel regions P. The first fluid 13 is sealed within the sealed container corresponding to the pixel regions P. The second fluid 12 immiscible with the first fluid 13 is contacted to the first fluid 13 and filled in the sealed container.

The driving substrate 18 includes an insulating substrate 17, a plurality of electrodes 14 and a hydrophobic insulator 15. The electrodes 14 are provided on an inner surface of the insulating substrate 17 corresponding to the pixel regions P, and therefore forming a plurality of gaps 141 therebetween. The gaps 141 respectively correspond to the side walls 16. The hydrophobic insulator 15 covers the electrodes 14 and gaps 141.

When no voltage is applied, the first fluid 13 extends over an entire area in a direction that is orthogonal to the direction in which light is transmitted. Therefore, the light is shielded by the first fluid 13 and the EWD device 10 displays a black image.

Referring to FIG. 7, when a voltage 18 is applied to one of the electrodes 14 and the second fluid 12, an interface between the first fluid 13 and the second fluid 12 changes due to electrocapillarity, so that the second fluid 12 contacts the hydrophobic insulator 15. Thus, light emitted from the driving substrate 18 can pass through the second fluid 12, and the EWD device 10 displays a white image.

In general, for obtaining a colored displaying, a color filter can be provided between the transparent substrate 11 and the second fluid 12. Referring to FIG. 8, a conventional color filter 20 is shown. The color filter 20 includes a plurality of color filter units 21 arranged in a matrix corresponding to the pixel regions P. A black matrix 22 is provided between the color filter units 21 for separating the color filter units 21 having different colors.

However, when the color filter units 21 directly contact the second fluid 12 for a long time, the color filter 20 may be corroded by the second fluid 12. That is, durability of the EWD device 10 is decreased. To overcome this problem, a protective layer can be provided to prevent the color filter units 21 from contacting the second fluid 12. However, this may increase a thickness of the EWD device 10 and limit the compactness thereof.

What is needed, therefore, is an EWD device that can overcome the above-described deficiencies.

SUMMARY

In an exemplary embodiment, an electro-wetting display (EWD) device includes a first substrate, a second substrate facing towards the first substrate, a hydrophobic insulator provided between the first and second substrates, a first fluid, a second fluid and a plurality of colored layers. The first fluid and the second fluid are immiscible with each other disposed between the hydrophobic insulator and the first substrate. The second fluid is electro-conductive or polar. The first fluid is provided between the hydrophobic insulator and the second fluid. The colored layers are provided between the hydrophobic insulator and the second substrate.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
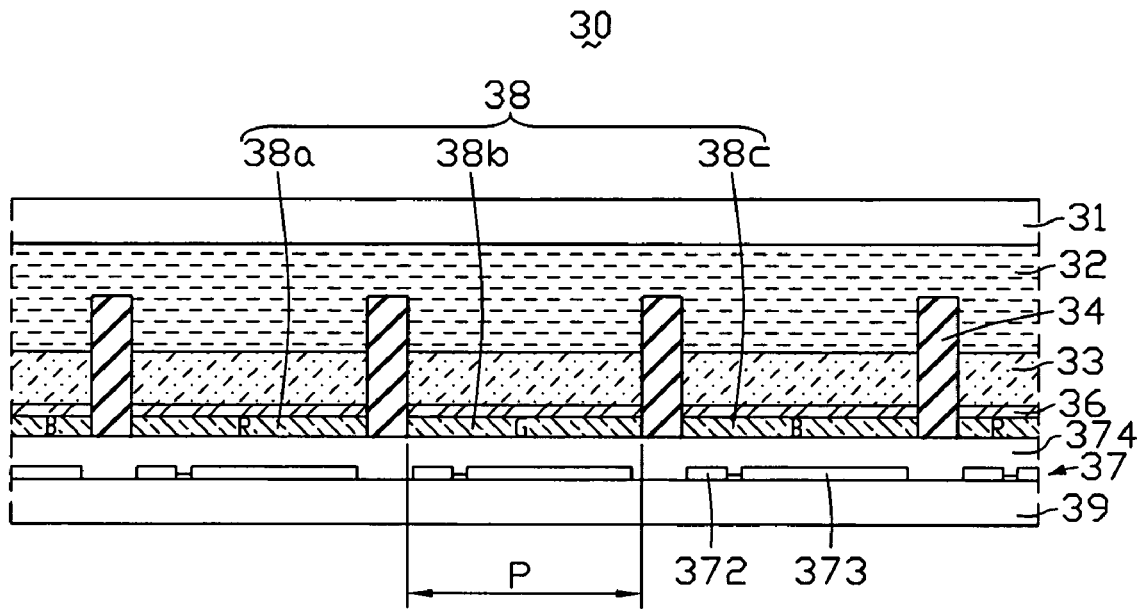
FIG. 1 is a cross section view of part of an EWD device according to a first embodiment of the present invention.

Referring to FIG. 1, an EWD device 30 according to a first embodiment of the present invention and with no voltage applied thereto is shown. The EWD device 30 includes a first substrate 31, a second substrate 39 facing towards the first substrate 31, a first fluid 33, a second fluid 32, a plurality of side walls 34, a hydrophobic insulator 36, a driving circuit layer 37, and a plurality of colored layers 38 including red colored units 38a, green color units 38b and blue color units 38c.

The driving circuit layer 37 is located on an inner surface of the second substrate 39. The side walls 34 are arranged in a lattice on a surface of the driving circuit layer 37 thereby defining a plurality of pixel regions P. The colored layers 38 are disposed on a surface of the driving circuit layer 37 and correspond to the pixel regions P. Thus, the side walls 34 between adjacent colored layers 38 separate the different colored layers 38. The hydrophobic insulator 36 covers the colored layers 38. The first fluid 33 is sealed within sealed spaces between adjacent side walls 34. The combined thickness of the first fluid 33, the colored layer 38 and the hydrophobic insulator 36 in each pixel region P is less than a height of the side walls 34. The second fluid 32, immiscible with the first fluid 33, is filled in the space between the first fluid 33 and the first substrate 31. The first fluid 33 can be, for example, an alkane-like hexadecane or colored oil. In this exemplary embodiment, the first fluid 33 is a black oil. The second fluid 32 is electro-conductive or polar, for example, water or a salt solution (e.g. a solution of KCL in a mixture and ethyl alcohol). The hydrophobic insulator 36 can be made of an amorphous fluoropolymer (AF 1600).

The driving circuit layer 37 includes a plurality of switching elements 372, a plurality of pixel electrodes 373 and an insulating protective layer 374. The pixel electrodes 373 are connected to the switching elements 372 for controlling a voltage applied to corresponding pixel electrodes 373. Each of the pixel electrodes 373 and the switching element 372 connected thereto are disposed corresponding to the pixel regions P. The insulating protective layer 374 covers the switching elements 372 and the pixel electrodes 373 and forms a planar surface. The pixel electrodes 373 can be made of indium tin oxide (ITO) or indium zinc oxide (IZO).

When no voltage is applied between any pixel electrode 373 and the second fluid 32, a contact interface between the first fluid 32 and the second fluid 33 is roughly parallel to the surface of the second substrate 39. Therefore the colored layers 38 are covered by the first fluid 33. Light emitted from the second substrate 39 passes through the colored layers 38 and the hydrophobic insulator 36 in sequence, and then is absorbed or blocked by the first fluid 33. Thus, the EWD device 30 displays a black image.

When a voltage is applied between one of the pixel electrodes 373 and the second fluid 32, a shape of the contact interface between the first fluid 33 and the second fluid 32 changes due to electrocapillarity so that the second fluid 32 contacts the hydrophobic insulator 36. Light emitted from the second substrate 39 passes through the corresponding colored layer 38, the hydrophobic insulator 36, and the second fluid 32 in sequence, and finally exits the first substrate 31. The shape of the contact interface between second fluid 32 and the first fluid 33 is adjusted in accordance with adjustment of the applied voltage, thereby decreasing or increasing a contact interface between the second fluid 32 and the hydrophobic insulator 36. Thus, the light can transmit through changeable regions of the colored layers 38 and are not covered by the first fluid 33. Therefore, the EWD device 30 can display color images.

Because the colored layers 38 are covered by the hydrophobic insulator 36, the hydrophobic insulator 36 can be used as a protective layer for preventing the colored layers 38 from being corroded by the second fluid 32 or the first fluid 33. Thus, the EWD device 30 has higher durability without increase in thickness of the EWD device 30. In addition, because the side walls 34 are configured as black matrices for separating the colored layers 38 having different colors, fabrication of the EWD device 30 is simplified.

Figure 2:
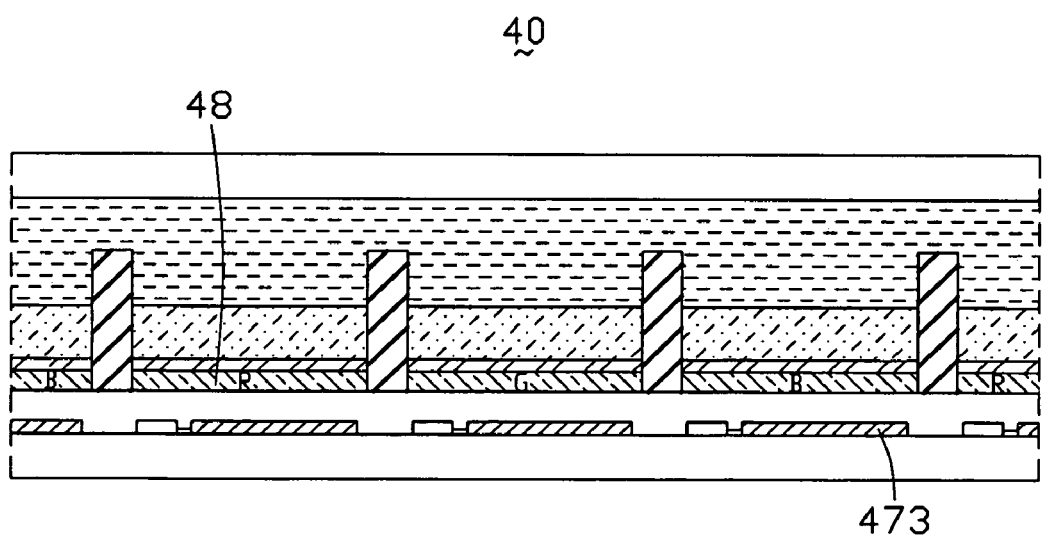
FIG. 2 is a cross section view of part of an EWD device according to a second embodiment of the present invention.

Referring to FIG. 2, an EWD device 40 according to a second embodiment of the present invention is similar to the EWD device 30, differing only in that pixel electrodes 473 of the EWD device 40 are reflective electrodes. The reflective electrodes can be made of metal having high reflectivity, for example, aluminum (Al), platinum (Pt), molybdenum (Mo) or aluminum alloy.

Figure 3:
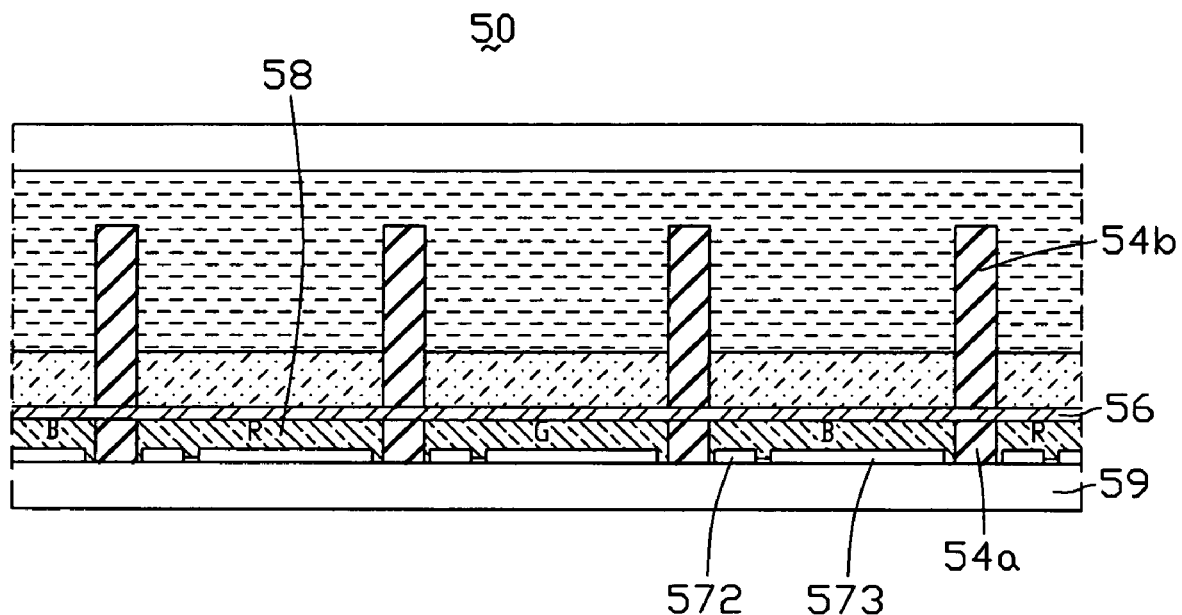
FIG. 3 is a cross section view of part of an EWD device according to a third embodiment of the present invention.

Referring to FIG. 3, an EWD device 50 according to a third embodiment of the present invention is similar to the EWD device 30. However, a plurality of colored layers 58 of the EWD device 50 are applied to cover surfaces of pixel electrodes 573 and switching elements 572, so that the colored layers 58 simultaneously serve as an insulating protective layer for protecting the pixel electrodes 573 and the switching elements 572. A plurality of separating walls 54a are respectively provided between two adjacent colored layers 58 thereby separating colored layers 58 having different colors. A hydrophobic insulator 56 covers the colored layers 58 and the separating walls 54a. A plurality of side walls 54b are located on the surface of the hydrophobic insulator 56 corresponding to the separating walls 54a. Material of the side walls 54b can be the same as that of the separating walls 54a. Because the hydrophobic insulator 56 is continuously formed on a surface of the colored layers 58 and the separating walls 54a, the fabricating method of the EWD device 50 is further simplified.

In addition, each of the separating walls 54a and a corresponding side wall 54b can be integrated into a whole in a same fabricating process. At the same time, each of the colored layers 58 is correspondingly covered by the hydrophobic insulator 56.

Figure 4:
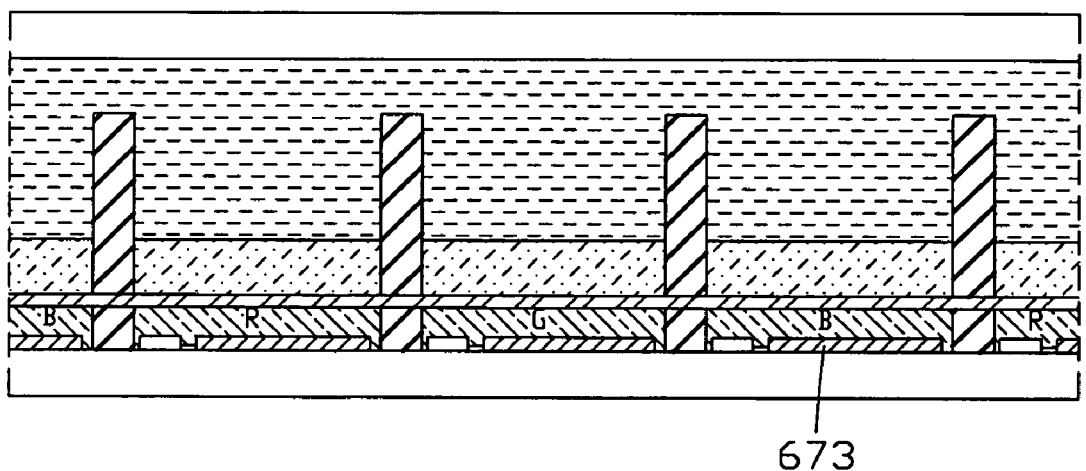
FIG. 4 is a cross section view of part of an EWD device according to a fourth embodiment of the present invention.

Referring to FIG. 4, an EWD device 60 according to a fourth embodiment of the present invention is similar to the EWD device 50, differing only in that pixel electrodes 673 of the EWD device 60 are reflective electrodes. The reflective electrodes can be made of metal having high reflectivity, for example, aluminum (Al), platinum (Pt), molybdenum (Mo) or aluminum alloy.

Figure 5:
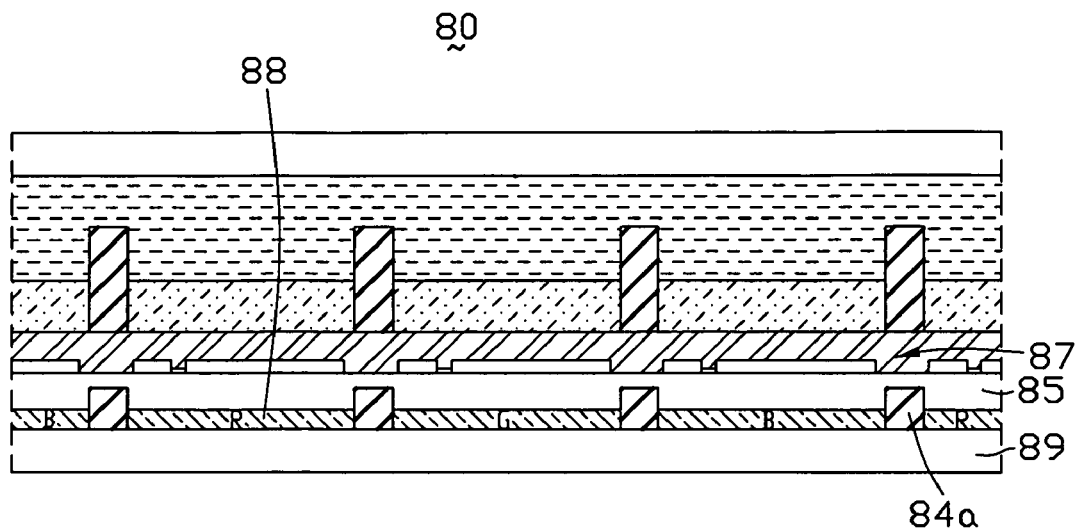
FIG. 5 is a cross section view of part of an EWD device according to a fifth embodiment of the present invention.
Figure 6:
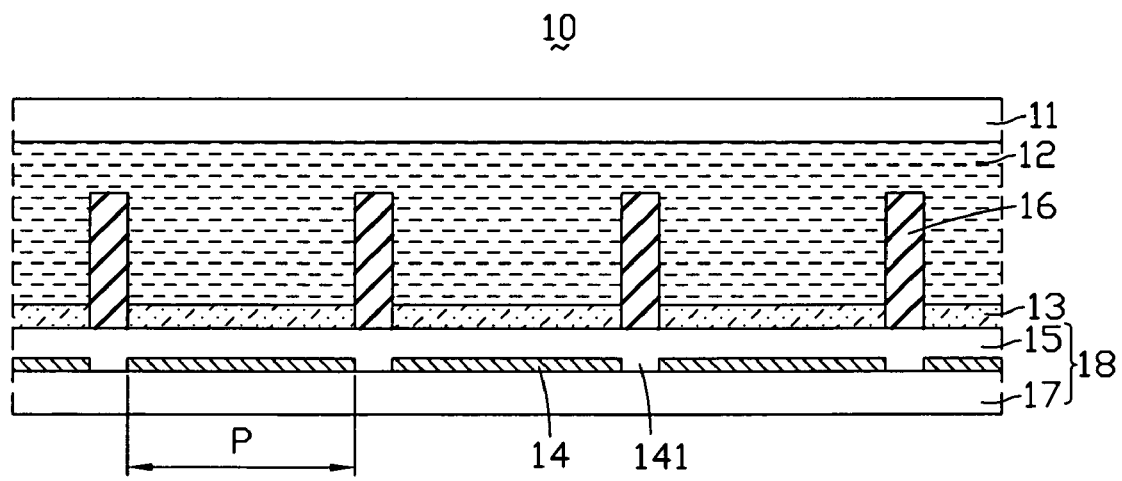
FIG. 6 is a cross section view of part of a conventional EWD device before a voltage is applied thereto.
Figure 7:
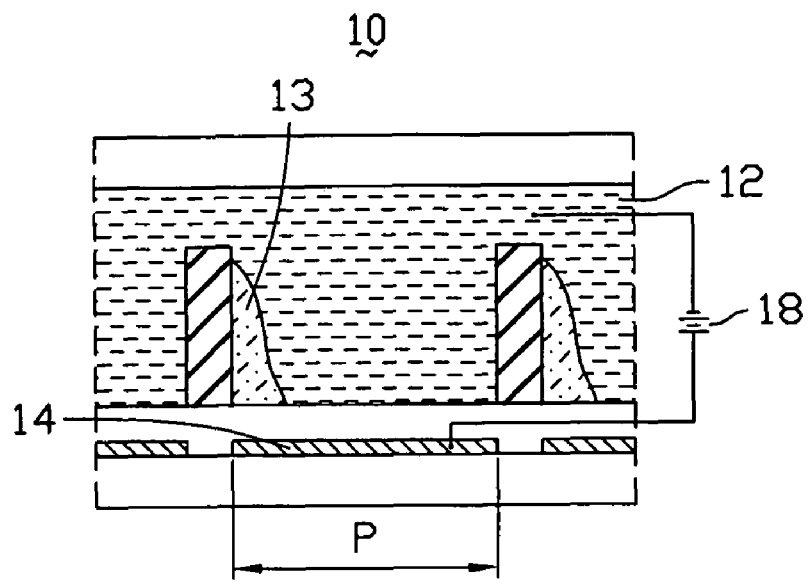
FIG. 7 illustrates a state when a voltage is applied to the EWD device of FIG. 6.
Figure 8:
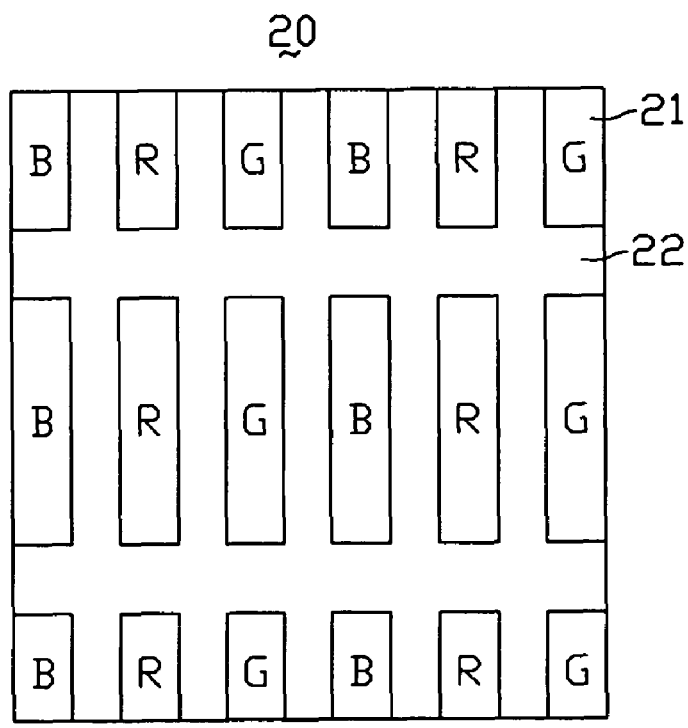
FIG. 8 is a plan view of a conventional color filter employed in the EWD device of FIG. 6.

Referring to FIG. 5, an EWD device 80 according to a fifth embodiment of the present invention is similar to the EWD device 50. However, colored layers 88 of the EWD device 80 are arranged in a matrix on an internal surface of a second substrate 89. A plurality of separating walls 84a severed as black matrices are disposed between adjacent colored layers 88. A coating layer 85 is provided to cover the colored layers 88 and the separating walls 84a, and forms a planar surface (not labeled). A driving circuit layer 87 of the EWD device 80 is located on the planar surface of the coating layer 85.

The colored layers of the EWD devices of the present invention can further include a plurality white colored units thereby promoting brightness of the EWD devices.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. An electro-wetting display (EWD) device, comprising:
a first substrate;
a second substrate facing the first substrate;
a hydrophobic insulator provided between the first and second substrates;
a first fluid and a second fluid immiscible with each other disposed between the hydrophobic insulator and the first substrate, the second fluid being electro-conductive or polar, the first fluid provided between the hydrophobic insulator and the second fluid; and
colored layers provided between the hydrophobic insulator and the second substrate.

2. The EWD device of claim 1, further comprising side walls arranged in a lattice on a surface of the hydrophobic insulator thereby defining pixel regions, the first fluid being sealed in the pixel regions.

3. The EWD device of claim 2, wherein the colored layers correspond to the pixel regions.

4. The EWD device of claim 2, wherein the colored layers are covered by the hydrophobic insulator.

5. The EWD device of claim 4, wherein the colored layers are separated by the side walls.

6. The EWD device of claim 5, wherein in a pixel region, a height of each side wall is greater than of a combined thickness of the colored layer, the hydrophobic insulator and the first fluid.

7. The EWD device of claim 2, further comprising a driving circuit layer provided between the first and second substrates, the driving circuit layer comprising pixel electrodes corresponding to the pixel regions.

8. The EWD device of claim 7, wherein the colored layers are located between the driving circuit layer and the hydrophobic insulator.

9. The EWD device of claim 8, wherein the driving circuit layer further comprises an insulating layer that is configured for protecting the pixel electrodes.

10. The EWD device of claim 9, wherein the colored layers are provided between the insulating layer and the hydrophobic insulator.

11. The EWD device of claim 8, wherein the colored layers are provided to cover the pixel electrodes.

12. The EWD device of claim 11, wherein the the colored layers are separated by separating walls, and the separating walls correspond to the side walls.

13. The EWD device of claim 12, wherein the separating walls are made from the same material as the side walls.

14. The EWD device of claim 12, wherein the hydrophobic insulator covers the colored layers and the separating walls.

15. The EWD device of claim 7, wherein the colored layers are provided between the driving circuit layer and the second substrate.

16. The EWD device of claim 8, wherein the pixel electrodes includes reflective electrodes.

17. The EWD device of claim 7, wherein the pixel electrodes includes transparent conductive electrodes.

18. An electro-wetting display (EWD) device, comprising:
a first substrate;
a second substrate facing the first substrate;
a hydrophobic insulator provided between the first and second substrates;
transparent electrodes arranged in a matrix and provided between the hydrophobic insulator and the second substrate;
a first fluid and a second fluid immiscible with each other disposed between the hydrophobic insulator and the first substrate, the second fluid being electro-conductive or polar, the first fluid provided between the hydrophobic insulator and the second fluid; and
colored layers respectively provided between the hydrophobic insulator and the transparent electrodes.

19. An electro-wetting display (EWD) device, comprising:
a first substrate;
a second substrate facing the first substrate;
a hydrophobic insulator provided between the first and second substrates;
reflective electrodes arranged in a matrix and provided between the hydrophobic insulator and the second substrate;
a first fluid and a second fluid immiscible with each other disposed between the hydrophobic insulator and the first substrate, the second fluid being electro-conductive or polar, the first fluid provided between the hydrophobic insulator and the second fluid; and
colored layers provided between the hydrophobic insulator and the reflective electrodes.

\* \* \* \* \*